United States Patent
Cho et al.

(10) Patent No.: US 12,216,376 B2
(45) Date of Patent: Feb. 4, 2025

(54) METASURFACE-BASED ACTIVE RETROREFLECTOR

(71) Applicant: U.S. Army DEVCOM, Army Research Laboratory, Adelphi, MD (US)

(72) Inventors: Sang-Yen Cho, Columbia, MD (US); Weimin Zhou, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 195 days.

(21) Appl. No.: 18/099,278

(22) Filed: Jan. 20, 2023

(65) Prior Publication Data
US 2024/0248366 A1    Jul. 25, 2024

(51) Int. Cl.
*G02F 1/19*      (2019.01)
*H04B 10/11*    (2013.01)

(52) U.S. Cl.
CPC .............. *G02F 1/19* (2013.01); *H04B 10/11* (2013.01); *G02F 2202/30* (2013.01); *G02F 2203/15* (2013.01)

(58) Field of Classification Search
None
See application file for complete search history.

(56) References Cited

U.S. PATENT DOCUMENTS

2009/0284826 A1*  11/2009  Langdon ................ G02F 1/116
                                                                   359/308

OTHER PUBLICATIONS

Kamali et al., "A review of dielectric optical metasurfaces for wavefront control", Apr. 25, 2028, ARXIV ID: 1804.09802, pp. 1-25 ( Year: 2018).*
Ullah et al., "Recent Advancement in Optical Metasurface: Fundament to Application", Jun. 28, 2022, Micromachines 2022, 13, 1025, pp. 1-26 (Year: 2022).*
Xiong et al., "Retro-Reflective Beam Communications with Spatially Separated Laser Resonator", Jun. 25, 2021, ARXIV ID: 2102.00147, pp. 1-12 (Year: 2021).*
Cuesta et al., "Coherent retroreflective metasurfaces", Jul. 30, 2021, Physical Review Research 3, L032025 (2021), pp. 1-6 (Year: 2021).*

* cited by examiner

*Primary Examiner* — David W Lambert
(74) *Attorney, Agent, or Firm* — Alan I. Kalb

(57) ABSTRACT

An optoelectronic device apparatus using active, frequency-selective metasurfaces to achieve retroreflection at a pre-determined single frequency and optionally provide signal modulation on the reflected light beam. The apparatus may use several active, frequency-selective metasurfaces to replace traditional optical lens and mirrors.

20 Claims, 3 Drawing Sheets

METASURFACE-BASED ACTIVE RETROREFLECTOR

GOVERNMENT INTEREST

The invention described herein may be manufactured and used by or for the Government of the United States for all governmental purposes without the payment of any royalty.

FIELD OF THE DISCLOSURE

The present disclosure relates generally to retroreflectors and, more particularly, to metasurface-based retroreflectors.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Retroreflectors are devices that reflect light and other radiation back toward the source of the radiation via a parallel path (i.e., the paths of the reflected rays are parallel to those of the incident rays). There are several existing active retroreflectors, which are typically based on bulky free-space optical systems, such as corner-cube, cat's eye, or optical shutter type retroreflectors. These are relatively heavy, expensive, and subject to performance limitations such as unduly limited acceptance angles.

SUMMARY OF THE INVENTION

Various deficiencies in the prior art are addressed below by the disclosed optoelectronic systems, methods and apparatus configured to achieve single wavelength light beam retroreflection and provide signal modulation on the reflected light beam.

In various embodiments, an optoelectronic apparatus uses active, frequency-selective metasurfaces to achieve retroreflection at a pre-determined single frequency and provide signal modulation on the reflected light beam. The apparatus uses several active, frequency-selective metasurfaces to replace traditional optical lens and mirrors. The embodiments also include power saving measures for the active modulator, therefore result in lower size, weight, power-consumption, and cost for the device manufacturing.

In one embodiment, a retroreflector apparatus for processing an optical beam incident thereon comprises an upper metasurface separated from a lower metasurface by an optically transparent region therebetween, the optically transparent region configured to pass the incident optical beam between the upper metasurface and the lower metasurface; the upper metasurface having a plurality of sub-wavelength scale resonators formed thereat, the upper metasurface configured to spatially modify a local phase of an optical beam passing therethrough to shape a wavefront thereof on a lower metasurface; the lower metasurface disposed above a frequency-selective reflector and having a plurality of sub-wavelength scale resonators formed thereat, the lower metasurface configured to spatially modify a local phase of an optical beam passing therethrough and reflected by the reflector to redirect focus the reflected optical beam on the focal plane of the upper metasurface; the upper metasurface configured, in response to an electric voltage imparted thereto, to spatially modify a local phase or a transmitted intensity of the reflected optical beam passing therethrough to provide a frequency-selective retroreflected optical beam.

In one embodiment, a surveillance communications apparatus comprises a signals receiver and encoder configured to encode received signals information to provide thereby an encoded data signal, and a retroreflector, the retroreflector comprising: an upper metasurface separated from a lower metasurface by an optically transparent region therebetween, the optically transparent region configured to pass an incident optical beam between the upper metasurface and the lower metasurface; the upper metasurface having a plurality of sub-wavelength scale resonators formed thereat, the upper metasurface configured to spatially modify a local phase of an optical beam passing therethrough to shape a wavefront thereof on a lower metasurface; the lower metasurface disposed above a frequency-selective reflector and having a plurality of sub-wavelength scale resonators formed thereat, the lower metasurface configured to spatially modify a local phase of an optical beam passing therethrough to the reflector and to focus a reflected optical beam on the focal plane of the upper metasurface; and the upper metasurface configured, in response to an electric voltage imparted thereto, to spatially modify a local phase or a transmitted intensity of the reflected optical beam passing therethrough to provide a frequency-selective retroreflected optical beam; wherein the electric voltage is modulated in accordance with the encoded data signal.

In various embodiments of an active retroreflector, upper or lower metasurfaces can be made of electro-optic materials, wherein an electric voltage imparted to the metasurface adapts a refractive index thereof to spatially modify the local phase of the optical beam passing through the upper and/or lower metasurfaces. Active modulation may be realized by the electro-optic film (or material performing this function), which may be used with the upper metasurface, the lower metasurface, or the region between the upper and lower metasurfaces.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
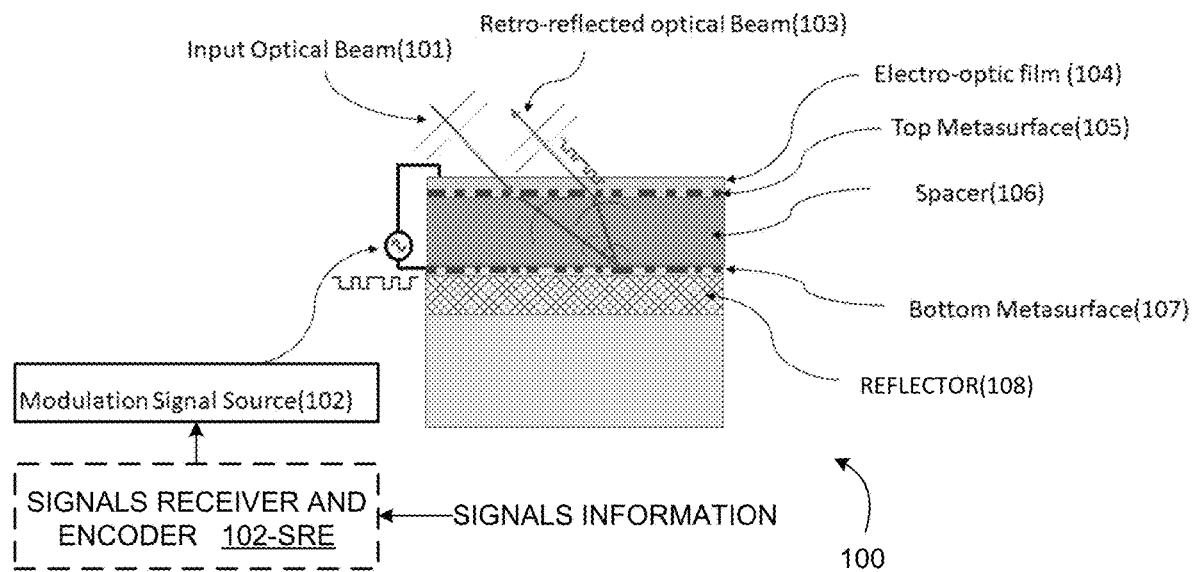
FIG. 1 depicts an illustration of a metasurface-based active retroreflector according to an embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

The various embodiments provide metasurface-based retroreflectors with active modulation that are suitable for use in many applications, such as free-space optical communications, free-space optical positioning and timing, remote sensing, precise optical distance measurements, Li-Fi communications, LiDAR, telemetry, optical identification, similar to radio frequency (RF) ID and the like.

Various embodiments use electro-optical control of a refractive index of a dielectric metastructure to actively modulate a metasurface-based flat retroreflection signal in the optical domain. This new retroreflector technology will significantly reduce the size, cost, weight, and power consumption of existing retroreflector-based systems. The metamaterials used may comprise nanometer-scale two-dimensional artificial materials having metasurfaces with permittivity close to zero and having the ability to control a laser beam and create intensity-modulated retroreflection through the control of amplitude and phase of light by applying an electrical signal (either voltage or current). Permittivity (or electric permittivity) is a constant of proportionality that exists between electric displacement and electric field intensity, and is equal to approximately $8.85 \times 10^{-12}$ farad per meter (F/m) in free space (a vacuum).

Various embodiments are directed to a retroreflector comprising an optically transparent region, substrate, or spacer configured to pass the incident optical beam to an upper metasurface, the upper metasurface having a plurality of sub-wavelength scale resonators formed thereat and configured to spatially modify a local phase of an optical beam passing therethrough so as to distribute a wavefront of that optical beam on a lower metasurface, the lower metasurface disposed above a reflector (e.g., a mirror) and having a plurality of sub-wavelength scale resonators formed thereat and configured to spatially modify a local phase of the optical beam passing therethrough such that when reflected back through the lower metasurface by the reflector a wavefront of the reflected optical beam is focused on the focal plane of the upper metasurface, the upper metasurface being further configured to spatially modify a local phase of the reflected optical beam passing therethrough to provide a retroreflected optical beam.

The optically transparent substrate may comprise an electro-optic film having embedded therein the upper metasurface, wherein an electric voltage imparted to the electro-optic film adapts a refractive index thereof to spatially modify the local phase of the optical beam passing through the upper and/or lower metasurface.

It is noted that the active modulation realized by the electro-optic film (or material performing this function) may be used with the upper metasurface, the lower metasurface, or the region between the upper and lower metasurfaces.

Other modifications and embodiments are discussed below.

Various embodiments use active metasurfaces to develop chip-scale retroreflectors, with some embodiments using epsilon near zero metamaterials to change the intensity of retroreflected light using electro-refraction and/or electro-absorption.

FIG. 1 depicts an illustration of a metasurface-based active retroreflector according to an embodiment. The metasurface-based active retroreflector comprises two active metasurfaces; namely, an upper or top metasurface 105 separated from a lower or bottom metasurface 107 by a spacer 106 (e.g., an optically transparent region or space imparting an appropriate separation distance, space, or gap between the upper/top 105 and lower/bottom 107 metasurfaces). The imparted separation distance between the upper metasurface and lower metasurface may be selected to allow the transmitted beam to be focused on the lower metasurface.

As depicted in FIG. 1, the upper or top metasurface 105 is embedded in a substantially transparent electro-optic substrate or film 104. A reflector (e.g., a frequency selective mirror) is positioned behind or under the lower or bottom metasurface 107 so as to reflect light back toward the lower or bottom metasurface 107. The reflector may comprise a mirror formed such as via a reflective surface coating, a frequency selective mirror, a gratings such as a frequency selective grating, a frequency selective metamaterial, and or another type of reflector within the various wavelengths of interest. The reflector may comprise a flat surface with a coating. The reflector may comprise another metasurface wavelength selective reflector.

When the top 104 and bottom 105 metasurfaces are activated by applying a bias voltage to a top metasurface associated with an electro-optic film 104 (such as with respect to the bottom metasurface 105), an input optical beam 101 incident on the retroreflector will be converted into a spherical beam and distributed (optionally focused) onto the surface of the bottom metasurface 107 after propagating through the spacer 106. The top metasurface 105 is embedded in the electro-optic film 104 and is configured to convert the shape of the wavefront of the input optical beam from flat to spherical by spatially changing the local phase of the transmitted beam. This local phase change in the top metasurface may be achieved by making nanometer scale resonators with different sizes, shapes, and orientations. The beam distributed, focused, and/or patterned on the bottom metasurface 107 will be reflected by the reflector 108.

In some embodiments, upper or top metasurface 105 embedded in a substantially transparent electro-optic substrate or film provides thereby an epsilon near zero metamaterial (e.g., Indium tin oxide (ITO)) configured to change intensity of retroreflected light using electro-refraction and/or electro-absorption. The electro-optic film comprises transparent conductive oxides such as indium tin oxide (ITO), fluorine doped tin oxide (FTO), aluminum doped zinc oxide, and gallium doped zinc oxide (AZO/GZO) operating in the epsilon near zero region.

The spacer 106 separating the top metasurface 105 and bottom metasurface 107 may be realized by a transparent substrate spacer/plate 106 of appropriate thickness (separation distance) with metasurfaces on its upper and lower surfaces (i.e., top surface of the spacer includes the top metasurface 105, bottom surface of the spacer 106 includes the bottom metasurface 107). The spacer 106 separating the top metasurface 105 and bottom metasurface 107 may be realized via an air gap, such as a configuration wherein the top 105 and bottom 107 metasurfaces are fabricated onto respective thin wafers, wherein the wafers are separated by the appropriate spacing distance to provide a spacer 106 comprising an air gap between the wafers. Other configurations may also be employed to provide the gap between the metasurfaces 105/107.

Optionally, the signal source 102 may comprise or have associated with it a modulation signal source supplying a modulated signal (e.g., a data signal) in addition to the bias voltage so as to impart modulated signal components such as data onto a retroflected return signal, such as a signals receiver and encoder 102-SRE configured to receive and encode signals information for transmission via the data signal.

The signals information signal may comprise an identification signal or beacon, a stream of audio or video data gathered by a surveillance device, an encoded location signal, and/or any other encoded or unencoded data. The modulation signal source may comprise a listening device or other intelligence gathering device configured to cause a modulation of the bias voltage in a manner enabling the reflected signal to be used to convey retrieved audio or other intelligence information to a receiver of the reflected signal. The modulation signal source may provide a data signal comprising one or more of an identification code, a location code, a static message (e.g., a warning, code message, or other simple message), a surveillance data stream, and so on.

The functions associated with a signals receiver and encoder 102-SRE as depicted and described herein may be implemented as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective tangible and non-transitory memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Thus, some embodiments provide a surveillance communications apparatus comprising a signals receiver and encoder configured to encode received signals information to provide thereby an encoded data signal, and a retroreflector as described herein, wherein an electric voltage used to spatially modify a local phase or a transmitted intensity of a reflected optical beam passing through an upper or lower metasurface is modulated in accordance with the encoded data signal.

Advantageously, the various embodiments provide an active retroreflector having ultralow Size, Weight, Power and Cost, while providing a large acceptance angle and high frequency selectivity.

The plurality of sub-wavelength scale resonators may comprise an array of sub-wavelength scale resonators with identical or different shapes, sizes, orientations, patters, pattern periods and/or other properties, which properties are selected to provide thereby a resonator array configured to control spatially varying phase response and/or transmitted intensity. Examples of sub-wavelength scale resonators include circular cylinders, elliptical cylinders, and polygonal prisms. One type of sub-wavelength scale resonators or different types of coupled sub-wavelength resonators can be repeated to achieve the desired phase or intensity responses.

The plurality of sub-wavelength scale resonators may comprise an array of spatially non-uniform sub-wavelength scale resonators to increase the operating bandwidth of the metasurfaces. Examples of non-uniform sub-wavelength scale resonators include sub-wavelength scale resonators with successively increasing or decreasing their periodicity or aperiodic resonators.

The plurality of sub-wavelength scale resonators may comprise an array of sub-wavelength scale resonators including sub-wavelength scale resonators of a first shape and sub-wavelength scale resonators of a second shape, wherein the first and second shapes are selected to exploit geometrical symmetry induced optical resonances for energy-efficient active retroreflection. Examples of the first and second shapes could be circular and elliptical pillars, rectangular and circular pillars, and so on.

The plurality of sub-wavelength scale resonators may comprise an array of sub-wavelength scale resonators including sub-wavelength scale resonators of a first pattern period and sub-wavelength scale resonators of a second pattern period, the first and second pattern period resonators being selected to effectively control the operating bandwidth of the retroreflection.

Figure 2:
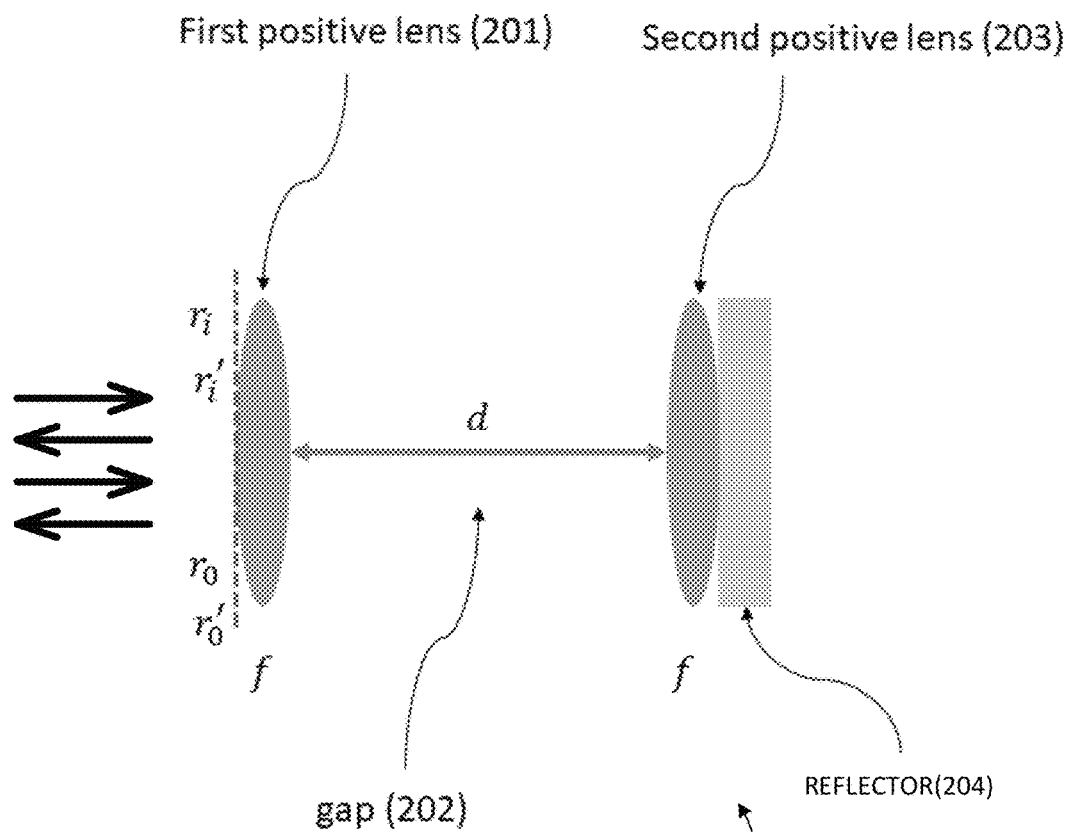
FIG. 2 depicts an illustration of a generalized free-space optical system model useful in understanding the retroreflector of FIG. 1.

FIG. 2 depicts an illustration of a generalized free-space optical system model useful in understanding the retroreflector of FIG. 1. That is, the metasurface-based active retroreflector of FIG. 1 is modelled in FIG. 2, which depicts an equivalent optical system to that of FIG. 1 and is discussed with respect to a simple traditional ray matrix analysis.

As shown in FIG. 2, a first positive lens 201 and a second positive lens 203 are separated by a gap 202 of a distance d, the second positive lens 203 is in optical communication with a reflector 204 (e.g., a mirror or frequency selective mirror). Input light rays ($r_i$, $r_i'$) incident upon the first positive lens 201 are transmitted toward and through the second positive lens 203, reflected by the reflector 204 back through the second positive lens 203, and transmitted toward and through the first positive lens 201 to provide thereby retroreflective output light rays ($r_o$, $r_o'$).

The first positive lens 201, second positive lens 203, and gap 202 therebetween correspond to the top metasurface 105, bottom metasurface 107, and spacer 106, respectively, of the apparatus of FIG. 1.

The input light rays ($r_i$, $r_i'$) and output light rays ($r_o$, $r_o'$) rays are specified by the height and the slope and related by the following ray matrices:

$$\begin{bmatrix} r_o \\ r_o' \end{bmatrix} = \begin{bmatrix} A & B \\ C & D \end{bmatrix} \begin{bmatrix} r_i \\ r_i' \end{bmatrix}$$

$$\begin{bmatrix} A & B \\ C & D \end{bmatrix} = \begin{bmatrix} 1 & 0 \\ -\frac{1}{f} & 1 \end{bmatrix} \begin{bmatrix} 1 & d \\ 0 & 1 \end{bmatrix} \begin{bmatrix} 1 & 0 \\ -\frac{1}{f} & 1 \end{bmatrix} \begin{bmatrix} 1 & 0 \\ 0 & 1 \end{bmatrix} \begin{bmatrix} 1 & 0 \\ -\frac{1}{f} & 1 \end{bmatrix} \begin{bmatrix} 1 & d \\ 0 & 1 \end{bmatrix} \begin{bmatrix} 1 & 0 \\ -\frac{1}{f} & 1 \end{bmatrix}$$

where $$A = \frac{2d^2 - 4df + f^2}{f^2},$$

$$B = 2d - \frac{2d^2}{f},$$

$$C = -\frac{2(d^2 - 3df + 2f^2)}{f^3},$$

$$D = \frac{2d^2 - 4df + f^2}{f^2}$$

If d=f then A=−1, B=0, C=0, D=−1

In this case, the output ray will be inverted with no magnification and traveling backward and parallel to the input ray. This backward traveling ray is a retroreflected beam. In various embodiments, the distance between the lenses is modified so that the output ray is traveling backward and parallel to the input ray with a different magnification.

The top and bottom metasurfaces consist of nanometer scale resonators which can be either metal or dielectric structures. The function of the resonators is to alter the phase of an optical beam passing therethrough to reshape the wave front of the propagating optical beam. As shown in FIG. 2, both metasurfaces mimic conventional positive (convex) lenses in the modeled embodiment.

Figure 3:
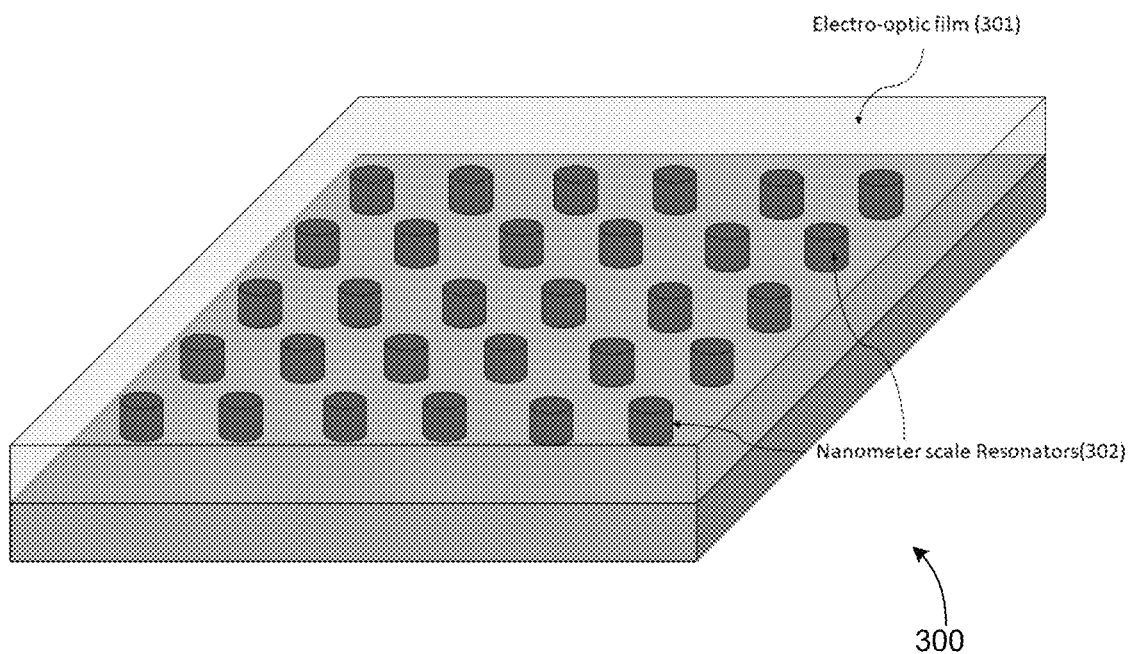
FIG. 3 depicts an illustration of an active metasurface created by nanometer scale resonators embedded in an electro-optic film and suitable for use in the various embodiments.

FIG. 3 depicts an illustration of an active metasurface created by nanometer scale resonators embedded in an electro-optic film and suitable for use in the various embodiments. Referring to FIG. 3, a top metasurface is integrated with an electro-optic film to externally control the transmitted light. The electro-optic film can be organic or inorganic materials that have strong electro-optic effects, such as electro-refraction or electro-absorption. In one embodiment, the electro-optic film is a layer of indium tin oxide (ITO), which exhibits strong electro-refraction and electro-absorption depending on the spectral range of the operation. Other alternative materials suitable for use in the embodiments comprise, illustratively but not exhaustively, the following electro-optic films including electro-optic polymers, lithium niobate, or optical phase change materials such as Ge—Sb—Te (GST) or Ge—Sb—Se—Te (GSST).

For electro-refraction, the refractive index of the electro-optic film 301 may be altered when an external electrical voltage is applied so as to focus or defocus a received beam to provide a relative refractive index change, as discussed below with respect to FIG. 4.

Figure 4:
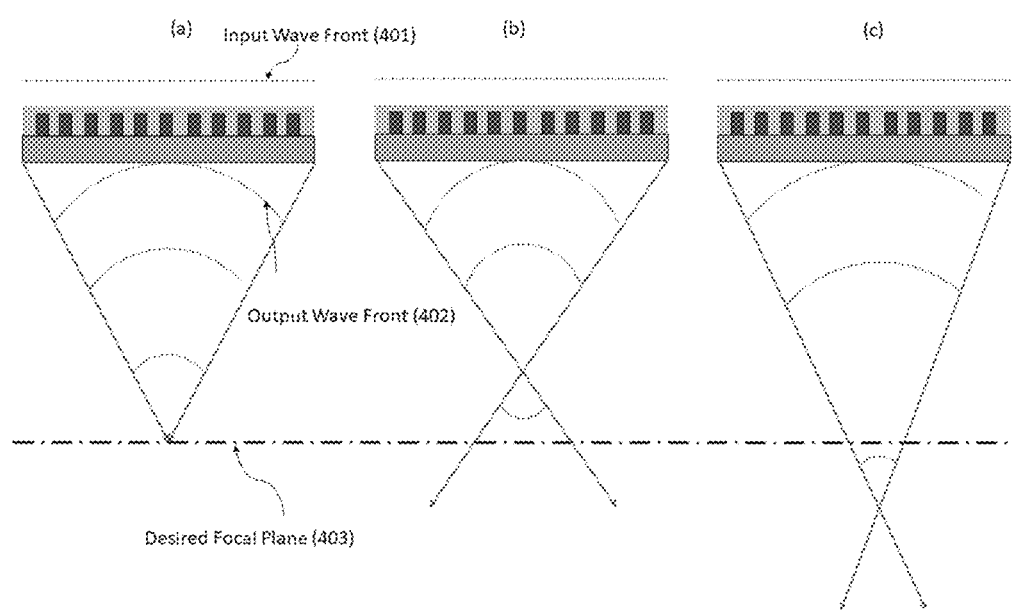
FIG. 4 graphically illustrates changes of curvature of a transmitted wave front of a transmitted beam responsive to using an active metasurface.

FIG. 4 graphically illustrates changes of curvature of a transmitted wave front of a transmitted beam responsive to using an active metasurface. Specifically, FIG. 4 depicts changes in the curvature of a transmitted beam wave front such as in response to external control of the transmitted beam using an active metasurface as discussed herein with respect to the various figures.

Referring to FIG. 4, each of three situations is depicted; namely, (a) focus of the wave front of a received beam 401 at a focal plane, (b) focus of the wave front of the received beam 401 prior to the focal plane, and (c) focus of the wave front of the received beam 401 beyond the focal plane. This focusing and defocusing (with respect to the focal plane) of the wave front of the received beam 401 is achieved in the various embodiments using an active metasurface as disclosed herein.

By applying an electrical signal to the active metasurface, the curvature of the transmitted wave fronts 402 can be controlled. By changing the radius of the curvature of the transmitted wave front, the focal point of the transmitted beam will be shifted from the desired focal plane 403. The desired focal plane corresponds to the location of the surface of a reflector such as a frequency selective mirror 108. When the transmitted beam is focused at the desired focal plane 403, the output beam from the retroreflector will be collimated and travel along the backward direction, parallel to the incident beam, creating a parallel reflection. The reflected beam will be transmitted toward the original transmitter. However, when the transmitted beam is defocused as shown in (b) and (c), the output beam exiting from the retroreflector will not be collimated and therefore not parallel to the input beam. Therefore, the reflected laser beam will not be transmitted toward the original transmitter, nor received at original transmitter through this process.

Figure 5:
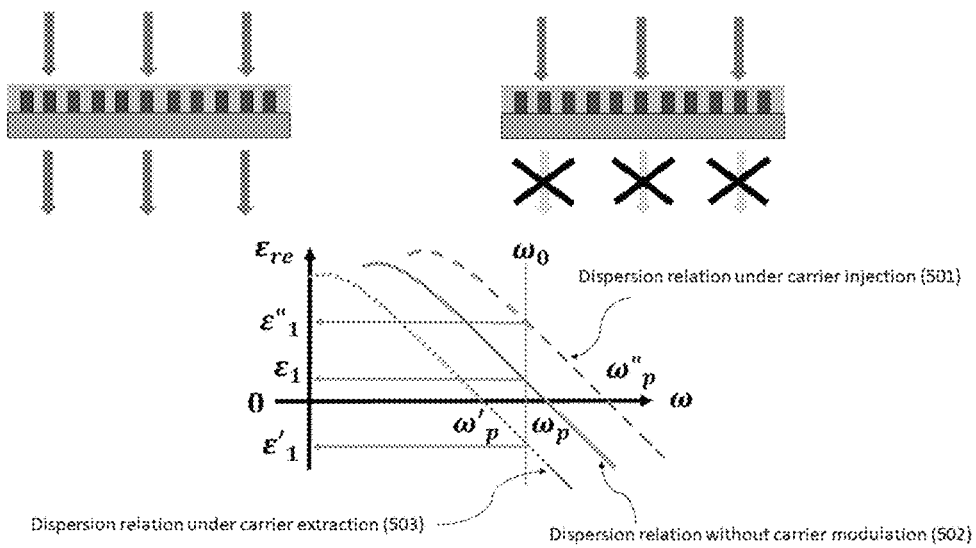
FIG. 5 graphically illustrates a mechanism to create active retroreflection using electro-absorption in an electrooptic film according to some embodiments.

FIG. 5 graphically illustrates a mechanism to create active retroreflection using electro-absorption in an electrooptic film according to some embodiments. Specifically, FIG. 5 depicts the working principle of the electro-absorption-based active metasurface. These embodiments operate by externally inducing a transition of electro-optic film from dielectric to metallic in transparent conductive oxides (TCOs) such as indium tin oxide (ITO). The transition in the material's optical property between dielectric and metallic around the plasma frequency $\omega_p$ can be achieved by controlling a free carrier concentration of TCOs. The plasma frequency of an ideal conductive medium is given by:

$$\omega_p = \sqrt{(nq^2)/(\varepsilon_0 m^*)}$$

where n is the carrier concentration, q is the unit charge, $\varepsilon_0$ is the electric permittivity in vacuum, and m* is the effective mass of an electron.

Referring to FIG. 5, where a transparent conductive oxide (TCO) is depicted as being under carrier injection (501), it can be seen that as the carrier concentration n increases, at $=\omega_0\omega$ the TCO has a positive relative electric permittivity value, labeled as $\varepsilon''_1>0$, (i.e. dielectric). In this case, an optical wave in the material can be a freely propagating wave. However, when this TCO is under carrier extraction (503), it can be seen that as the carrier concentration n decreases, the TCO can change the sign of its electric permittivity value to negative, labeled as $\varepsilon'_1<0$, (i.e. metallic) at the same angular frequency $\omega_0$. An optical wave in a metallic medium becomes a rapidly decaying evanescent wave. Therefore, by switching from the material's optical property from dielectric to metallic, various embodiments are configured to use the metasurface as an optical shutter.

Figure 6:
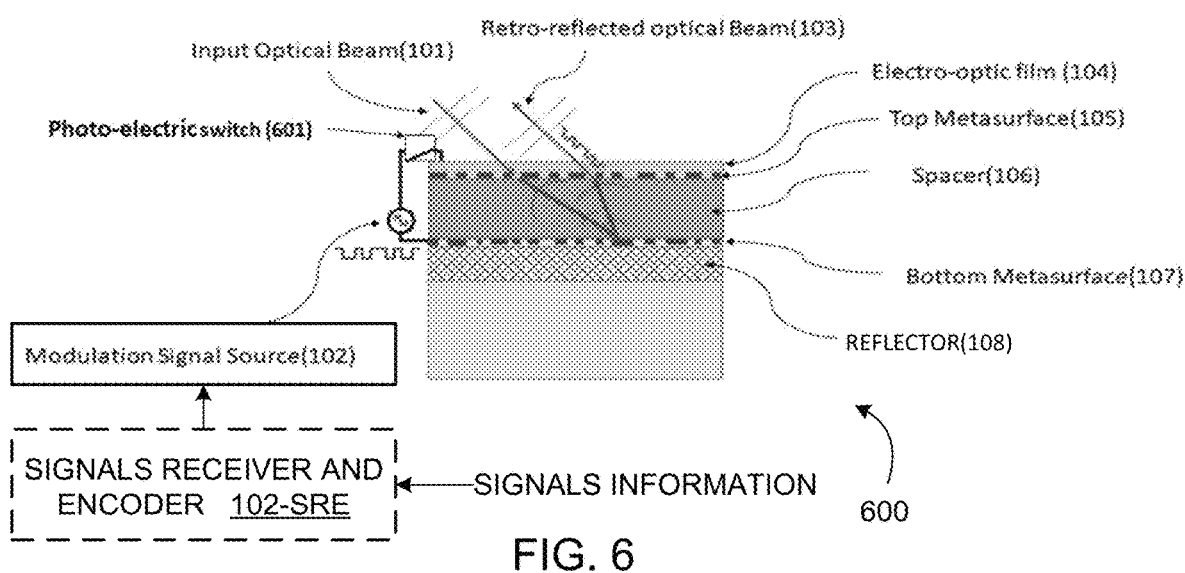
FIG. 6 depicts an illustration of a metasurface-based active retroreflector according to an embodiment.

FIG. 6 depicts an illustration of a metasurface-based active retroreflector according to an embodiment. Specifically, the embodiment 600 of FIG. 6 is similar to the embodiment 100 of FIG. 1, except that the embodiment 600 of FIG. 6 contemplates a retroreflector that is activated via a photo-electric switch so as to conserve battery power.

Referring to FIG. 6, the embodiment 600 presented therein includes a photo-electric switch 601 (e.g., a laser-activated electric switch, optionally with a wavelength passband filter). Without the designated input laser signal being present, the power is off for the electro-optical modulation. With the designated laser input laser signal being present, the switch will be turned on by such incident laser light so as to start the modulation. This approach can greatly reduce overall battery power consumption by activating the retroreflector only during the period of established active communication link between the original transmitter and the reflector. Another option is to use solar cell to recharge the battery to operate the active retroreflector.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A retroreflector apparatus for processing an optical beam incident thereon, comprising:
    an upper metasurface separated from a lower metasurface by an optically transparent region therebetween, the optically transparent region configured to pass the incident optical beam between the upper metasurface and the lower metasurface;
    the upper metasurface having a plurality of sub-wavelength scale resonators formed thereat, the upper metasurface configured to spatially modify a local phase of an optical beam passing therethrough to shape a wavefront thereof on a lower metasurface;
    the lower metasurface disposed above a frequency-selective reflector and having a plurality of sub-wavelength scale resonators formed thereat, the lower metasurface configured to spatially modify a local phase of an optical beam passing therethrough to the reflector and to focus a reflected optical beam on the focal plane of the upper metasurface;
    the upper metasurface configured, in response to an electric voltage imparted thereto, to spatially modify a local phase or a transmitted intensity of the reflected optical beam passing therethrough to provide a frequency-selective retroreflected optical beam.

2. The apparatus of claim 1, wherein the optically transparent region separating the upper metasurface from the lower metasurface comprises an optically transparent substrate.

3. The apparatus of claim 2, wherein the optically transparent substrate comprises an upper surface having formed thereupon the upper metasurface, and a lower surface having formed thereupon the lower metasurface.

4. The apparatus of claim 1, wherein the optically transparent region separating the upper metasurface from the lower metasurface comprises an air gap.

5. The apparatus of claim 1, wherein the upper metasurface is embedded within an optically transparent substrate having a refractive index adapted in response to the electric voltage so as to spatially modify the local phase of the optical beam passing through the upper metasurface.

6. The apparatus of claim 5, wherein the electro-optic film comprises transparent conductive oxides such as indium tin oxide (ITO), fluorine doped tin oxide (FTO), aluminum doped zinc oxide, and gallium doped zinc oxide (AZO/GZO) operating in the epsilon near zero region.

7. The apparatus of claim 1, wherein the optically transparent substrate comprises a polymer film having embedded therein the upper metasurface, wherein an electric voltage imparted to the electro-optic film adapts a refractive index thereof to spatially modify the local phase of the optical beam passing through the upper metasurface.

8. The apparatus of claim 2, wherein the optically transparent substrate comprises a semiconductor having embedded therein the upper metasurface, wherein an electric voltage imparted to the electro-optic film adapts a refractive index thereof to spatially modify the local phase of the optical beam passing through the upper metasurface.

9. The apparatus of claim 1, wherein the optically transparent region imparts a separation distance between the upper metasurface and lower metasurface that allows the transmitted beam to be focused on the lower metasurface.

10. The apparatus of claim 2, wherein the reflector comprises at least one of a frequency selective mirror, a frequency selective grating, and a frequency selective metamaterial.

11. The apparatus of claim 1, wherein the plurality of sub-wavelength scale resonators comprises an array of sub-wavelength scale resonators with identical or different shapes, sizes, and orientations to control spatially varying phase response and transmitted intensity.

12. The apparatus of claim 1, wherein the plurality of sub-wavelength scale resonators comprises an array of spatially non-uniform sub-wavelength scale resonators to increase the operating bandwidth of the metasurfaces.

13. The apparatus of claim 1, wherein the plurality of sub-wavelength scale resonators comprises an array of sub-wavelength scale resonators including sub-wavelength scale resonators of a first shape and sub-wavelength scale resonators of a second shape to exploit the geometrical symmetry induced optical resonances for energy-efficient active retroreflection.

14. The apparatus of claim 1, wherein the plurality of sub-wavelength scale resonators comprises an array of sub-wavelength scale resonators including sub-wavelength scale resonators of a first pattern period and sub-wavelength scale resonators of a second pattern period to effectively control the operating bandwidth of the retroreflection.

15. The apparatus of claim 1, wherein the electric voltage imparted thereto is configured for modulation in accordance with a data signal.

16. The apparatus of claim 15, wherein the data signal conveys any of an identification code, a location code, a static message, and a surveillance data stream.

17. A surveillance communications apparatus, comprising:
 a signals receiver and encoder configured to encode received signals information to provide thereby an encoded data signal; and
 a retroreflector, comprising:
  an upper metasurface separated from a lower metasurface by an optically transparent region therebetween, the optically transparent region configured to pass an incident optical beam between the upper metasurface and the lower metasurface;
  the upper metasurface having a plurality of sub-wavelength scale resonators formed thereat, the upper metasurface configured to spatially modify a local phase of an optical beam passing therethrough to shape a wavefront thereof on a lower metasurface;
  the lower metasurface disposed above a frequency-selective reflector and having a plurality of sub-wavelength scale resonators formed thereat, the lower metasurface configured to spatially modify a local phase of an optical beam passing therethrough to the reflector and to focus a reflected optical beam on the focal plane of the upper metasurface; and
  the upper metasurface configured, in response to an electric voltage imparted thereto, to spatially modify a local phase or a transmitted intensity of the reflected optical beam passing therethrough to provide a frequency-selective retroreflected optical beam;
  wherein the electric voltage is modulated in accordance with the encoded data signal.

18. The apparatus of claim 17, wherein the optically transparent region separating the upper metasurface from the lower metasurface comprises at least one of an air gap and an optically transparent substrate, the optically transparent substrate having an upper surface having formed thereupon the upper metasurface, and a lower surface having formed thereupon the lower metasurface.

19. The apparatus of claim 17, wherein the upper metasurface is embedded within an optically transparent substrate having a refractive index adapted in response to the electric voltage so as to spatially modify the local phase of the optical beam passing through the upper metasurface.

20. The apparatus of claim 19, wherein the plurality of sub-wavelength scale resonators comprises an array of sub-wavelength scale resonators with shapes, sizes, and orientations selected to control spatially varying phase response and transmitted intensity.

* * * * *

UNITED STATES PATENT AND TRADEMARK OFFICE
CERTIFICATE OF CORRECTION

PATENT NO. : 12,216,376 B2
APPLICATION NO. : 18/099278
DATED : February 4, 2025
INVENTOR(S) : Cho et al.

Page 1 of 1

It is certified that error appears in the above-identified patent and that said Letters Patent is hereby corrected as shown below:

On the Title Page

Item (72), Line 1:
The name listed is Sang-Yen Cho. The correct name is Sang-Yeon Cho.

Signed and Sealed this
First Day of July, 2025

Coke Morgan Stewart
*Acting Director of the United States Patent and Trademark Office*